United States Patent
Chand et al.

(12) 
(10) Patent No.: US 9,158,851 B2
(45) Date of Patent: Oct. 13, 2015

(54) LOCATION AWARE COMMENTING WIDGET FOR CREATION AND CONSUMPTION OF RELEVANT COMMENTS

(75) Inventors: Ashootosh Chand, Bangalore (IN); Suresh Kumar Kalyanaraman, Chennai (IN)

(73) Assignee: Yahoo! Inc., Sunnyvale, CA (US)

( * ) Notice: Subject to any disclaimer, the term of this patent is extended or adjusted under 35 U.S.C. 154(b) by 962 days.

(21) Appl. No.: 13/332,338

(22) Filed: Dec. 20, 2011

(65) Prior Publication Data
US 2013/0159406 A1 Jun. 20, 2013

(51) Int. Cl.
- G06F 17/30 (2006.01)
- H04L 12/58 (2006.01)
- H04L 29/08 (2006.01)
- G06Q 10/10 (2012.01)
- G06Q 50/00 (2012.01)

(52) U.S. Cl.
CPC ............ G06F 17/3087 (2013.01); G06Q 10/10 (2013.01); G06Q 50/01 (2013.01); H04L 51/20 (2013.01); H04L 67/18 (2013.01)

(58) Field of Classification Search
CPC ...... H04L 51/20; H04L 67/18; G06F 17/3087
See application file for complete search history.

(56) References Cited

U.S. PATENT DOCUMENTS

| | | | | |
|---|---|---|---|---|
| 6,983,313 B1* | 1/2006 | Korkea-Aho | ................. | 709/219 |
| 8,073,461 B2* | 12/2011 | Altman et al. | ............. | 455/456.1 |
| 8,438,156 B2* | 5/2013 | Redstone et al. | ............ | 707/724 |
| 8,542,097 B2* | 9/2013 | Ross et al. | ..................... | 340/8.1 |
| 8,578,274 B2* | 11/2013 | Druzgalski et al. | ........... | 715/738 |
| 9,009,249 B2* | 4/2015 | Redfern et al. | ............... | 709/207 |
| 2008/0071929 A1* | 3/2008 | Motte et al. | ................... | 709/246 |
| 2008/0133488 A1* | 6/2008 | Bandaru et al. | ................... | 707/3 |
| 2009/0019085 A1* | 1/2009 | Abhyanker | ................ | 707/104.1 |
| 2009/0111487 A1* | 4/2009 | Scheibe | ..................... | 455/456.6 |
| 2010/0162093 A1* | 6/2010 | Cierniak | ...................... | 715/205 |
| 2010/0241507 A1* | 9/2010 | Quinn et al. | ............... | 705/14.42 |
| 2011/0041075 A1* | 2/2011 | Cierniak et al. | .............. | 715/745 |
| 2011/0173150 A1* | 7/2011 | van Zwol et al. | ............... | 706/50 |
| 2011/0238762 A1* | 9/2011 | Soni et al. | ..................... | 709/206 |
| 2012/0124139 A1* | 5/2012 | Dempski | ...................... | 709/205 |

* cited by examiner

*Primary Examiner* — Aaron Strange
(74) *Attorney, Agent, or Firm* — Martine Penilla Group, LLP

(57) ABSTRACT

Methods and computer readable medium for allowing a user to participate in an online conversation for a head content includes receiving a response from a user for the head content. The response from the user is geo-tagged with a location of the user. A counter indicative of number of responses received for the head content at the location is updated for the head content to include the response from the user. The responses received for the head content from the plurality of users is filtered to generate a subset of the responses related to the location of the user. The subset of responses and an interactive tag cloud for the head content is presented to the user. The subset of responses is presented in a ranked order. The tag cloud identifies one or more locations that have received greatest number of responses from the plurality of users.

12 Claims, 7 Drawing Sheets

LOCATION AWARE COMMENTING WIDGET FOR CREATION AND CONSUMPTION OF RELEVANT COMMENTS

BACKGROUND

1. Field of the Invention

The present invention relates to commenting widgets, and more particularly, to location aware commenting widgets for social interaction.

2. Description of the Related Art

In the digital era, providing content and having interactions related to the presented content has taken on a whole new meaning. For instance, the content of an article is made available to all the users as soon as the article is "published" on the internet. The internet has established itself as an interactive medium wherein users are able to publish articles of interest, facilitate chat, create/participate in discussion groups and interactive blogs. In the highly competitive world of the internet, content providers who publish articles on their website are looking into ways to engage a user in order to increase the traffic to their website. One way the content providers try to keep the users engaged is by providing the users with tools to comment directly and discuss on stories/articles published on the content provider's website and postings to weblogs.

With the sheer number of articles/weblogs available on the internet and the number of people having access to the internet, some of the articles (i.e. head content) attract hundreds and even thousands of responses from users from all over the world. This is especially the case when the articles are related to breaking news that are of great significance to the users. The responses include comments, recommendations and/or ratings. A user is able to rate, recommend or respond to comments created by another user for an article or comment/recommend an article based on its content. When an article has thousands of responses from a plurality of users, it is very difficult and often impossible for a user to follow conversations or consume responses related to an article that the user really cares about. As more comments accumulate for the article, the user is exposed to a "junkyard" of comments for the article leading to user aggravation. A new user will most likely participate in an online conversation about a published article or in a weblog when the user is able to identify content from his/her own friends, when the user sees content from users from a geographical location that is of relevance to the user, if the conversation is about articles or topics the user is interested in or likes, or if the user's prior contributions to the particular article are recognized by the online community. Typically, the content providers present all the comments from all users and do not provide the ability to filter the comments to ones that are most relevant to the user.

It would be advantageous to have the ability to filter comments/responses to articles so as to be able to view only those comments that are relevant to the user. It would also be advantageous to have a way of viewing comments from other locations without hassle.

It is in this context that the embodiments of the invention arise.

SUMMARY

Embodiments of the present invention describe methods and an algorithm that allows a user to participate in an online conversation for a head content using location-based filter. Using this filter, an algorithm, such as a location check algorithm, is able to filter thousands of responses received from a plurality of users for a head content published on the internet so as to identify and present responses/comments that are most relevant to a user. The presented responses represent a focused subset of the multitude of responses received for the head content that the user can consume thereby enabling the user to interact with user generated content that is relevant for the article of content. The location-based filter provides the ability to remove an entry barrier for user generated content contribution so that passive consumers can be encouraged to become active contributors by participating in a subset of the online discussion that is more relevant to the user.

It should be appreciated that the present invention can be implemented in numerous ways, such as, methods, systems and computer readable medium. Several inventive embodiments of the present invention are described below.

In one embodiment, a method for allowing a user to participate in an online conversation for a head content, is disclosed. The method includes receiving a response from a user for the head content. The response is provided as a rating, a recommendation or a comment. The response from the user is geo-tagged with a geo location associated with the user. A counter associated with the geo location is updated for the head content to include the response from the user. The counter tracks number of responses received for the head content at the geo location from a plurality of users. The counter is indicative of popularity of the geo location with the plurality of users, for the head content. The responses received for the head content from the plurality of users is filtered to generate a subset of the responses related to the geo location of the user. The subset of responses is presented to the user along with an interactive tag cloud associated with the head content. The subset of responses is presented to the user in a ranked order. The tag cloud identifies one or more geo locations that have received greatest number of responses from the plurality of users for the head content.

In another embodiment, a method for allowing a user to participate in an online conversation for a head content, is disclosed. The method includes receiving a selection of a geo location on a webpage, from a user. Responses accumulated from a plurality of geo locations for the head content is filtered to generate a subset of responses related to the geo location selected by the user. The subset of responses for the head content is presented to the user. An interactive tag cloud is also presented to the user alongside the subset of the responses for the head content. The interactive tag cloud identifies the most popular geo locations based on the number of accumulated responses from a plurality of users at the respective geo locations for the head content.

In another embodiment, a computer program product encoding program instructions embodied on a computer readable medium is provided. The computer program product includes program instructions for receiving a response from a user for the head content. The response is provided as a rating, recommendation or a comment. Program instructions are provided for geo-tagging the response with a geo location associated with the user. The computer program product further includes program instructions for updating a counter associated with the geo location to include the response from the user. The counter tracks number of responses received from a plurality of users for the head content at the geo location. The counter is indicative of popularity of the respective geo locations with the plurality of users, for the head content. Program instructions are included for filtering responses received from the plurality of users for the head content to generate a subset of the responses related to the geo location of the user and for presenting the subset of responses to the user along with an interactive tag cloud associated with the head content. The responses within the subset are presented in a ranked order and the tag cloud identifies one or more geo locations that have received greatest number of responses for the head content from the plurality of users.

The embodiments of the invention provide an efficient algorithm for filtering responses from a plurality of users associated with a plurality of geo locations to generate a subset of responses for a specific geo location requested by or associated with the user. The algorithm also presents a visual tool to identify the most popular geo locations that have attracted greatest number of responses from a plurality of users. The visual tool is in the form of an interactive tag cloud with the most popular geo locations represented in textual format. The size of the text for each geo location within the tag cloud is indicative of a degree of popularity of the geo location based on the amount of responses accumulated for that geo location. The user has the ability to change the geo location when providing a response to the head content and the response provided by the user is associated with the changed geo location. The interactive tag cloud also provides a user with the ability to select any geo location available within the tag cloud in order to view the responses available at the selected geo location. The embodiments provide a way to engage a user by presenting the user with responses from a select set of users from a particular geo location so that the user can view the responses and engage in relevant interaction with a select group of users that the user associates with and is comfortable interacting.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods, system and computer readable medium for allowing a user to participate in an online conversation for a head content that employs geo location filtering. Using the filtering tool, the algorithm is able to filter responses for a head content so as to identify, select and present a subset of the responses related to a specific geo location, to a user. The geo location filtering enables a user to select a particular geo location that the user belongs to or is interested in viewing and a location check algorithm implementing location filtering filters the responses for the geo location. The algorithm also provides the ability for a user to change the geo location before responding to a comment or before generating a comment for the head content. A tag cloud provides a visual representation of geo locations that have the most number of responses for the head content. The interactive tag cloud provides the user with the ability to select and view comments from various geo locations included in the tag cloud. The user is thus able to view a selective subset of responses for a particular geo location so as to be able to consume the conversation at the geo location for the head content and not get overwhelmed by the number of comments and responses from all over the world.

Figure 1:
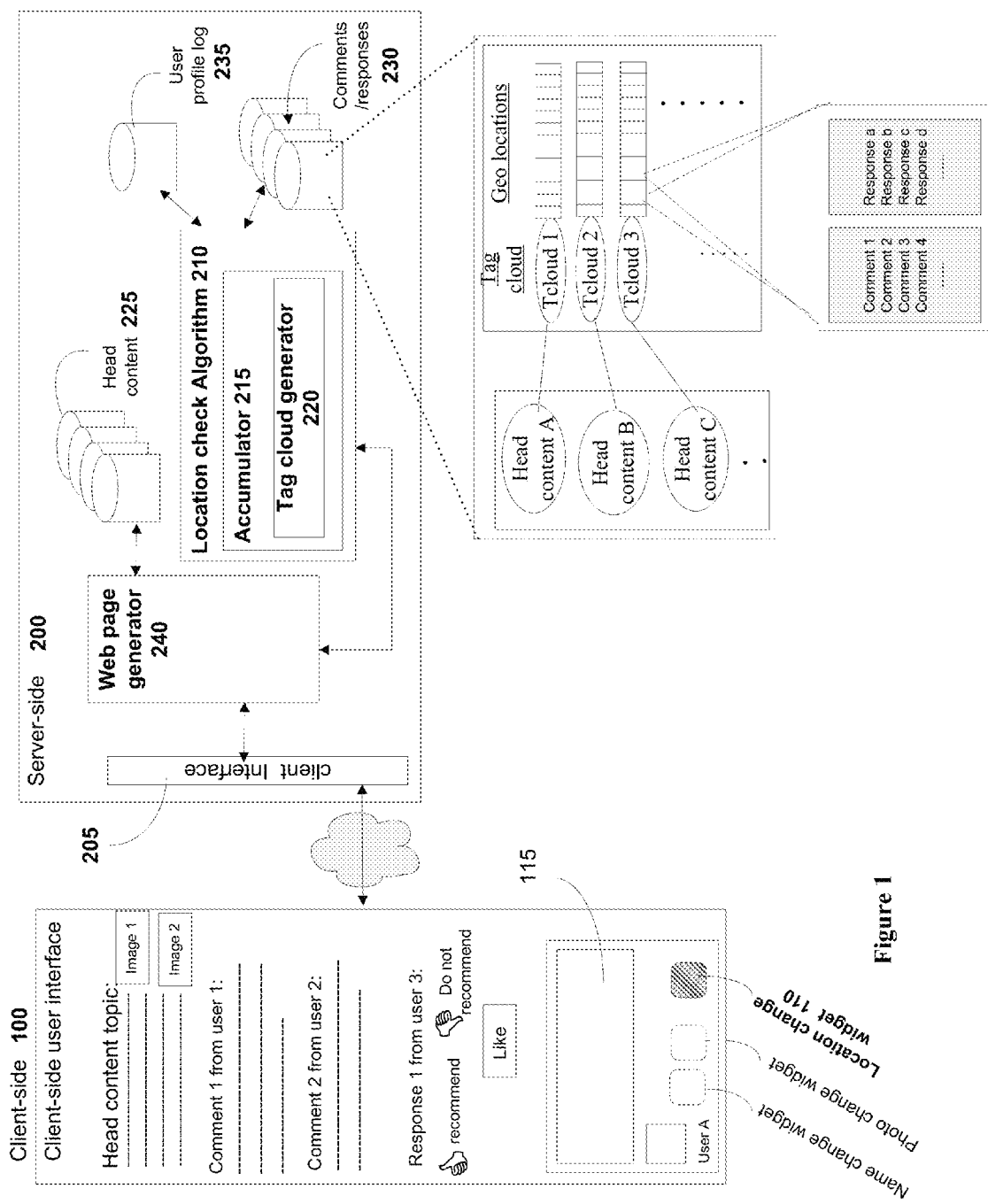
FIG. 1 illustrates a simple block diagram of a system identifying various modules for allowing a user to participate in an online conversation for a head content, in one embodiment of the invention.

With the brief overview, various embodiments of the invention will now be described in detail with reference to the figures. FIG. 1 illustrates a simple block diagram of a system that uses a location check algorithm to enable a user to participate in an online conversation for a head content that is most relevant to the user. Head content, as used in this application, refers to an article, such as a news article or an article of information that is published on a content provider's website. The head content can be in any form including a text, image, audio, video, or any other form that can be rendered on a webpage. For instance, a head content may be a news article headline on Yahoo! news, CNN news or any other news website. The head content is not restricted to news articles but can be extended to other topics of discussion.

A user accesses a webpage of a content provider, such as Yahoo! news webpage, and selects a head content, such as a news article, using a client-side user interface on a client device 100. A client interface 205 on a server device 200 receives the user's selection over a network, such as the Internet, and forwards the selection to a web page generator 240. The web page generator identifies the selected head content, queries a database, such as a head content database 225, to obtain content for the selected head content, wherein the head content database 225 is a repository of a plurality of head contents from a plurality of sources. The web page generator 240 also interacts with a location check algorithm 210 to obtain responses accumulated for the selected head content from a plurality of users for the geo location of the user. In order to accumulate the responses for the geo location of the user, the check algorithm 210, in one embodiment, analyzes the selection request to identify the user's attributes, such as a user identifier, a geo location, etc., and verifies the user's attributes against a user profile log 235 to determine if the geo location of the user is same as the user's previous geo location. The user profile log 235 is a repository that stores a plurality of users attributes captured during previous interactions. In another embodiment, the check algorithm analyzes the selection request to identify the user's attributes. Upon identification and/or verification of the user's attributes, the check algorithm 210 queries one or more comment/response databases 230 to identify responses that are related to the selected head content for presentation to the user at the client device. The responses may include comments related to the head content, rating of the head content, rating of one or more comments related to the head content, recommendation related to the one or more comments or recommendations related to the selected head content.

An accumulator 215 within the check algorithm 210 accumulates all the responses for the selected head content. The response database 230 is a repository that stores the responses related to different head contents provided by a plurality of users from different geo locations. The accumulator 215 then filters the accumulated responses for the head content to identify a subset of the responses that are related to the geo location of the user. The accumulator 215 forwards the subset of the responses to the web page generator 240.

In addition to identifying a subset of the responses for the geo location of the user, the accumulator also generates a tag cloud identifying a plurality of geo locations that have responses accumulated for the head content. The geo locations may include the geo location of the user or the geo locations may be distinct from the geo location of the user. In order to generate the tag cloud, the accumulator 215 maintains a counter for each geo location that keeps track of the number of comments or responses to one or more of other user's comments at the geo location. As and when users add comments/responses to other users comments for the head content for a specific geo location, the respective geo location's counter is incremented. A tag cloud generator 220 within the accumulator 215 generates a tag cloud for the head content using the counters maintained by the accumulator 215 for the various geo locations. The tag cloud generator 220 compares the counter values of each geo location and selects geo locations that have highest values when generating the tag cloud. The tag cloud generator 220 uses the counter values to specify textual size of the locations within the tag cloud with the geo location having the highest number of responses having larger size text than the geo location that has less number of responses. It should be noted herein that the geo locations represented in the tag cloud may not include all the geo locations but a subset of geo locations that have the greatest number of comments/responses. In one embodiment, a distinct tag cloud is generated for each head content. The tag cloud information is maintained in a database for subsequent retrieval and update. The tag cloud information may be stored and maintained separately within the comments/response database 230 or may be maintained in a separate database, for subsequent retrieval.

When additional responses are received for the head content from different users at different geo locations, the counter associated with the corresponding geo location is incremented and the tag cloud for the head content may be refined to reflect the updated values of the counter associated with the different geo locations for the head content. The generated/refined tag cloud is forwarded to the web page generator 240 for assembly into a webpage.

The check algorithm also provides a tool for changing geo location for viewing the responses. In one embodiment, the tool may be in the form of a widget 110, such as a location change widget, for enabling a user to change the geo location so as to view responses for a different geo location other than the one associated with the user. It should be noted that the tool may be of any other form and is not restricted to the widget.

The web page generator 240 assembles the webpage using the content from the head content database and the subset of the responses for the geo location of the user from the check algorithm module and forwards the assembled webpage to the client device for rendering. In one embodiment, the generated webpage includes a topic of the head content, responses received for the head content at the geo location of the user, the tag cloud identifying a plurality of geo locations with highest number of responses accumulated from a plurality of users and a location change widget. The generated webpage also includes a comment box 115 for receiving comments from users and options to provide responses including ratings and recommendations for the head content or for other user's comments. In another embodiment, the webpage may also include content related to the head content, in addition to the other information assembled by the web page generator.

The check algorithm, thus, provides a tool to filter the responses received from a plurality of users based on a geo location associated with a user so that the user is presented with a subset of responses (i.e. comments, ratings, recommendations) that the user can most relate to and is of most relevance to the user. The small subset of the responses allows a user to connect with other users that share similar demographics, such as geo location and other user attributes that my include age, interest, etc. The algorithm provides an efficient noise reducing filter so that the user is exposed to only the responses that the user is interested in viewing and desires to interact.

Figure 2:
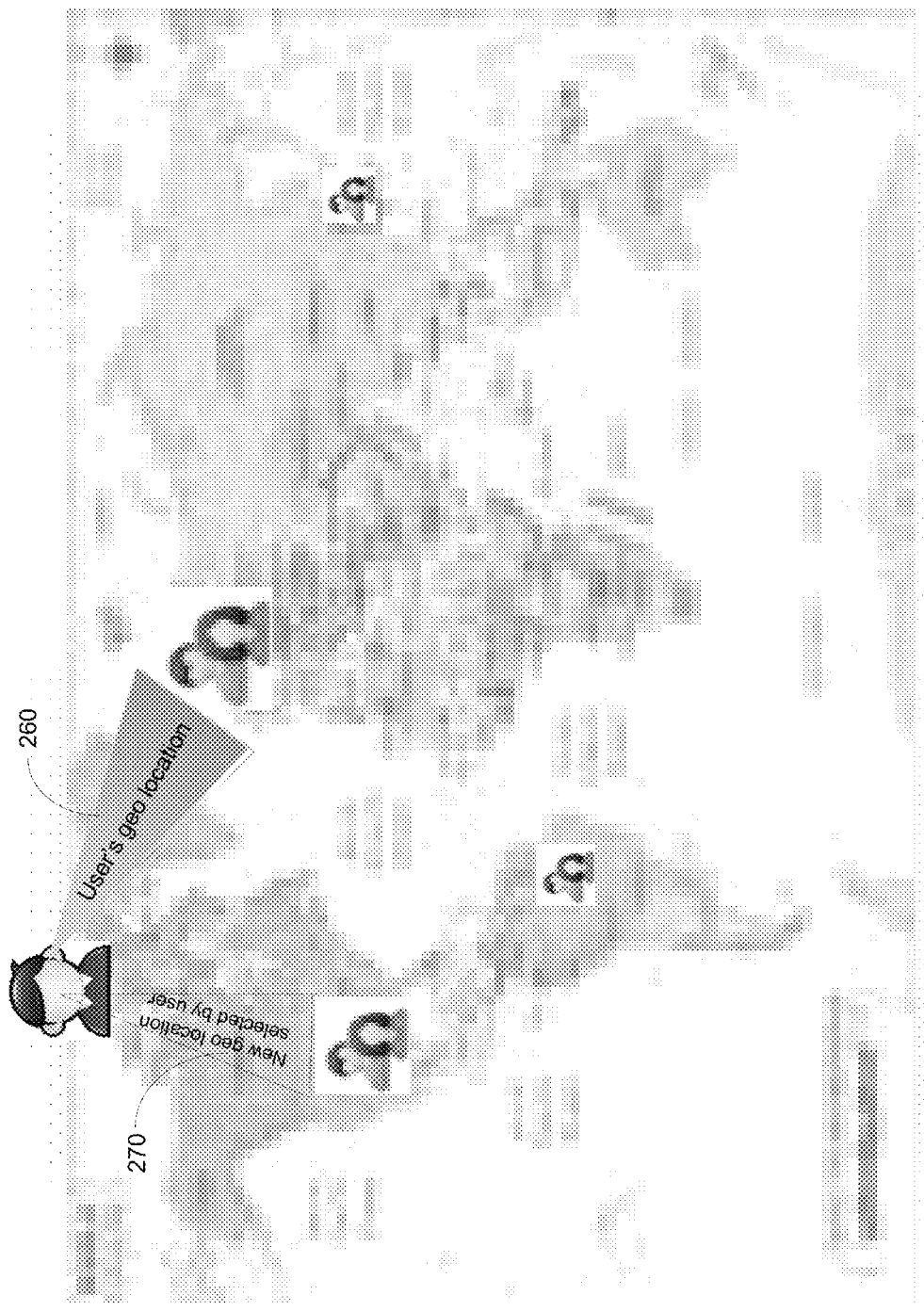
FIG. 2 illustrates simplified representation of location filter employed by an algorithm that allows users to participate in an online conversation, in one embodiment of the invention.

FIG. 2 illustrates the implementation of a location based filter for a user, in one embodiment. For instance, a head content attracts responses from a plurality of users from various geo locations around the world. The algorithm allows a user to select a particular geo location and presents comments, ratings and recommendations for the head content from the selected geo location. In one embodiment, the algorithm initially identifies the geo location to which the user belongs and filters responses for the head content based on the geo location of the user along with a tag cloud of the most popular geo locations that have attracted greatest number of responses. Subsequently, if the user desires to view responses from a different geo location, the user can select a different geo location in the tag cloud and the algorithm will recognize the selection of the new geo location and present the responses from the selected geo location. FIG. 2 illustrates the user's geo location 260 wherein the algorithm will select the responses originating from the user's geo location. Subsequently, when the user selects an alternate geo location 270 the algorithm will identify responses originating from this alternate geo location and presents the same to the user for viewing.

Figure 3:
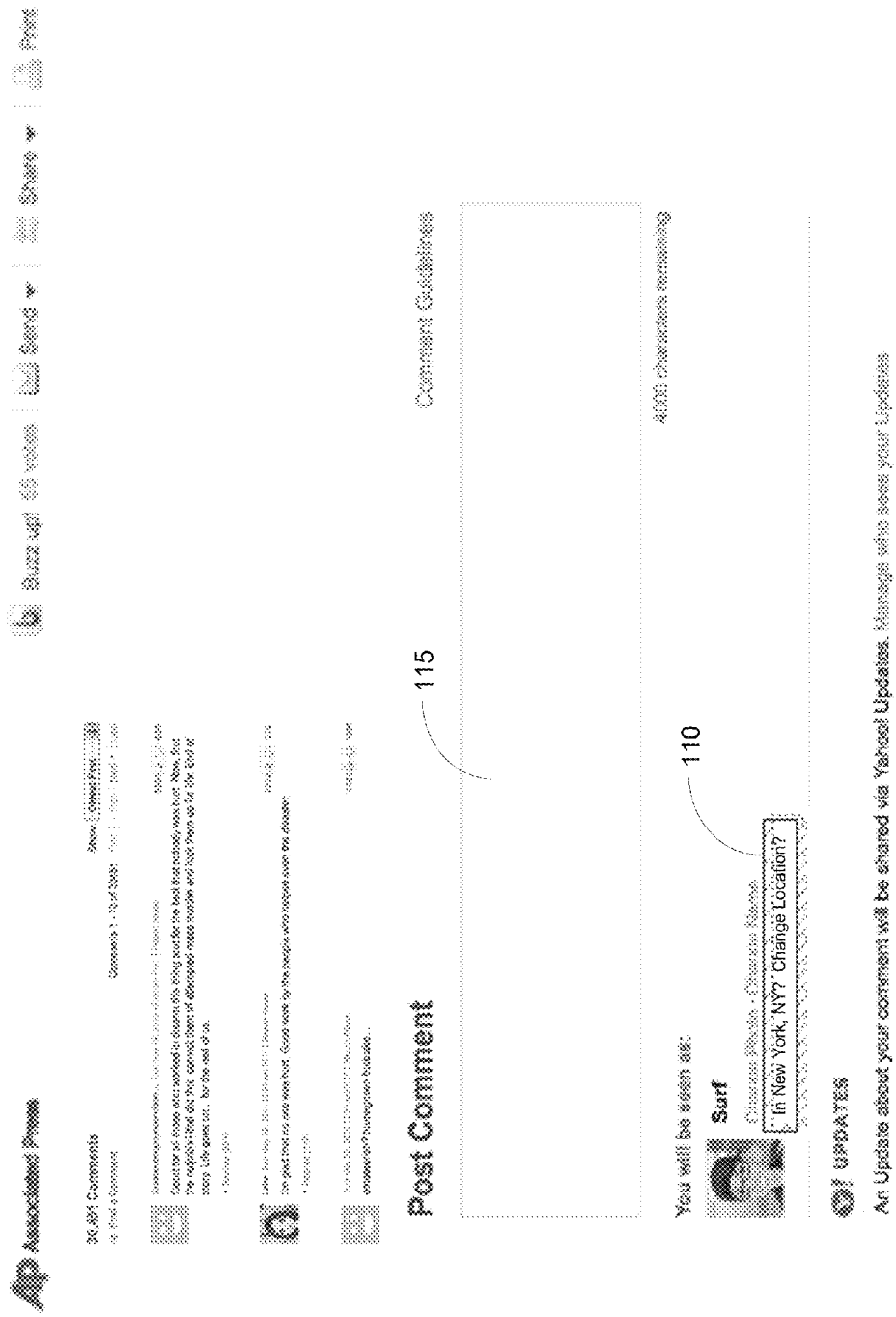
FIG. 3 illustrates a sample webpage that enables a user to participate in an online conversation, in one embodiment of the invention.

FIG. 3 illustrates a sample webpage that the webpage generator assembles with information obtained from the location check algorithm and head content database for a selected head content. The webpage includes a title of the head content and a plurality of responses from a plurality of users originating from a particular geo location for the selected head content. The check algorithm also provides a comment box 115 for receiving user comment and a location change tool 110, such as a location change widget, to enable a user to specify a location other than the location for which the responses are provided on the webpage. The user may specify a different geo location using the location change tool at the time the user provides comments related to the head content or may specify a different geo location prior to presenting comments or without presenting any comments. When the user specifies a different geo location, the algorithm recognizes the new geo location selected by the user and if the user presents comments when he/she specifies the new geo location, the comments are tagged with the new geo location and stored in the responses/comments database on the server. Further, the counter for the new geo location is incremented to take into consideration the comment from the user. The algorithm identifies responses related to the new geo location for the head content and forwards the responses associated with the new geo location to the web page generator for accumulation and transmission to the client device in response to the selection of the new geo location. The webpage is refreshed at the client device. The refreshed webpage provides the comments, ratings and responses for the new geo location so that the user can view and interact. The new geo location is associated with the user till the time the user selects a different geo location using the location change tool. Any responses from the user are tagged with the new geo location.

Figure 4:
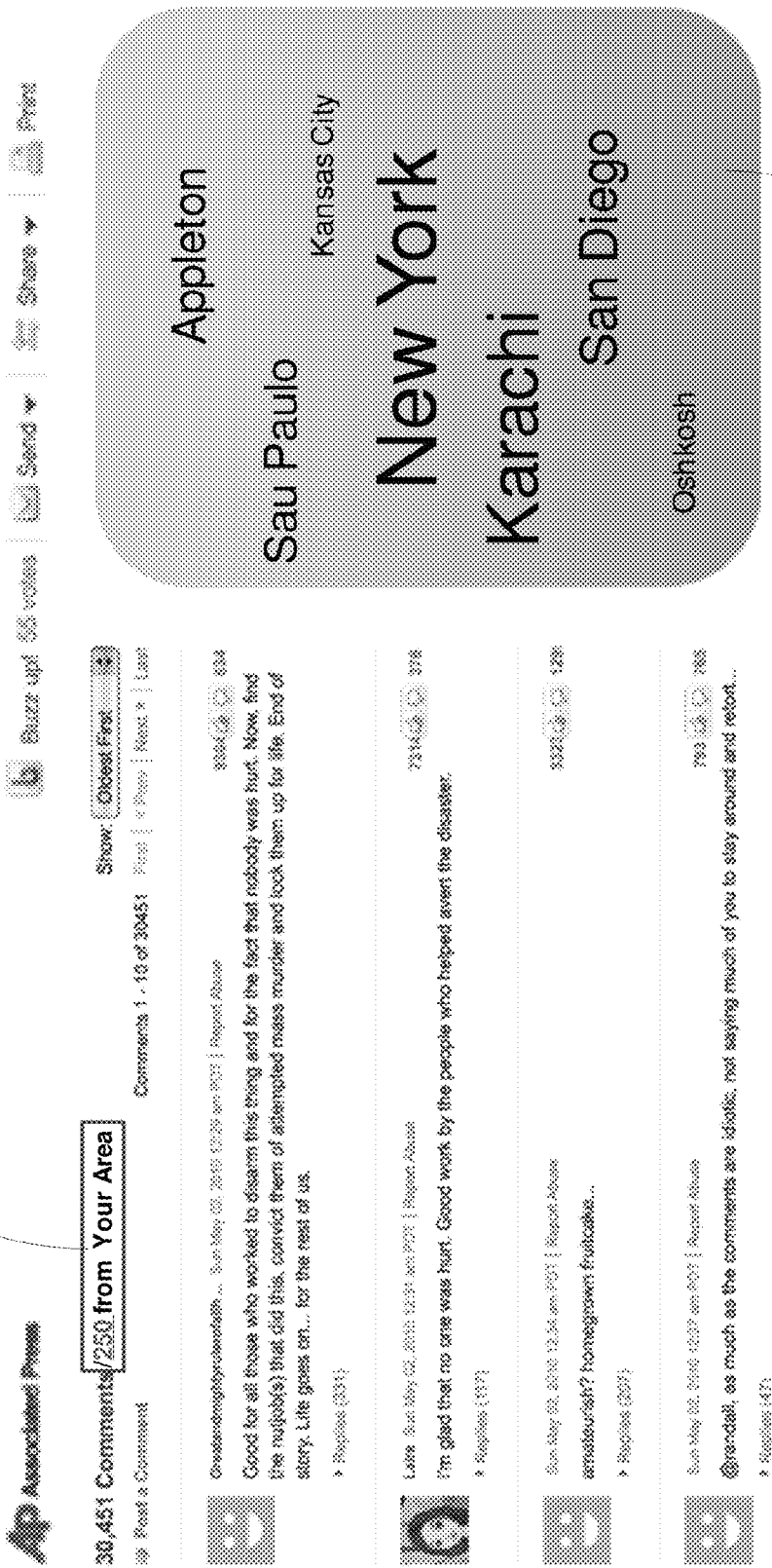
FIG. 4 illustrates a sample webpage with a subset of responses and an interactive tag cloud for the user, in one embodiment of the invention.

FIG. 4 illustrates a sample webpage depicting a tag cloud 415 for the head content illustrated in FIG. 3. The tag cloud 415 presented for the head content related to the title on the webpage, identifies a plurality of geo locations. Each of the geo locations is presented in the tag cloud in the form of a link so that when a user clicks on a geo location, the respective geo locations responses are automatically filtered and presented to the user on the webpage. The text size of the name of the geo location differs based on the number of comments/responses available at the geo location for the head content. For instance, as represented in FIG. 4, the order of the geo locations based on a decreasing text size are New York, followed by Karachi, San Diego, Sau Paulo, Appleton, Kansas City and Oshkosh, indicating that the number of responses for the head content represented by the title "NY car bomb suspect believe to act alone in US" appears to be highest in New York followed by Karachi, San Diego, and so on. According to the tag cloud, Kansas City and Oshkosh have the least amount of responses. As mentioned earlier, the geo locations presented in the tag cloud may not include all the geo locations for which responses have been provided by users. Rather, the tag cloud only presents a subset of the geo locations where the responses received from the users are the highest. In one embodiment, the tag cloud includes the most popular 5 or 10 locations for the head content. When new comments/responses are received at a particular geo location, the counter for the particular geo location is incremented. The counters of all the geo locations are used during generation of a tag cloud with the counter value of selected geo locations driving a size of a text for the corresponding geo location in the tag cloud. For instance, if two locations are included in a tag cloud with the first location having 25 comments and the second location having 300 comments, the textual size of the second location in the tag cloud will be bigger than the textual size of the first location.

In addition to the tag cloud, the algorithm may also provide a summary box 410 that summarizes the number of responses from the geo location specified by the user. As shown in FIG. 4, the head content may include 30,451 comments of which 250 comments are from the geo location specified by the user. The algorithm provides this information using the information provided in the counter maintained for each geo location. It should be noted herein that the geo location associated with the user may be the last geo location the user specified in the location change tool or if the user did not specify a different geo location, then the geo location of the user would be the geo location in which the user is physically located. The information related to the user's geo location may be obtained from the profile log maintained for each user by the check algorithm.

Figure 5:
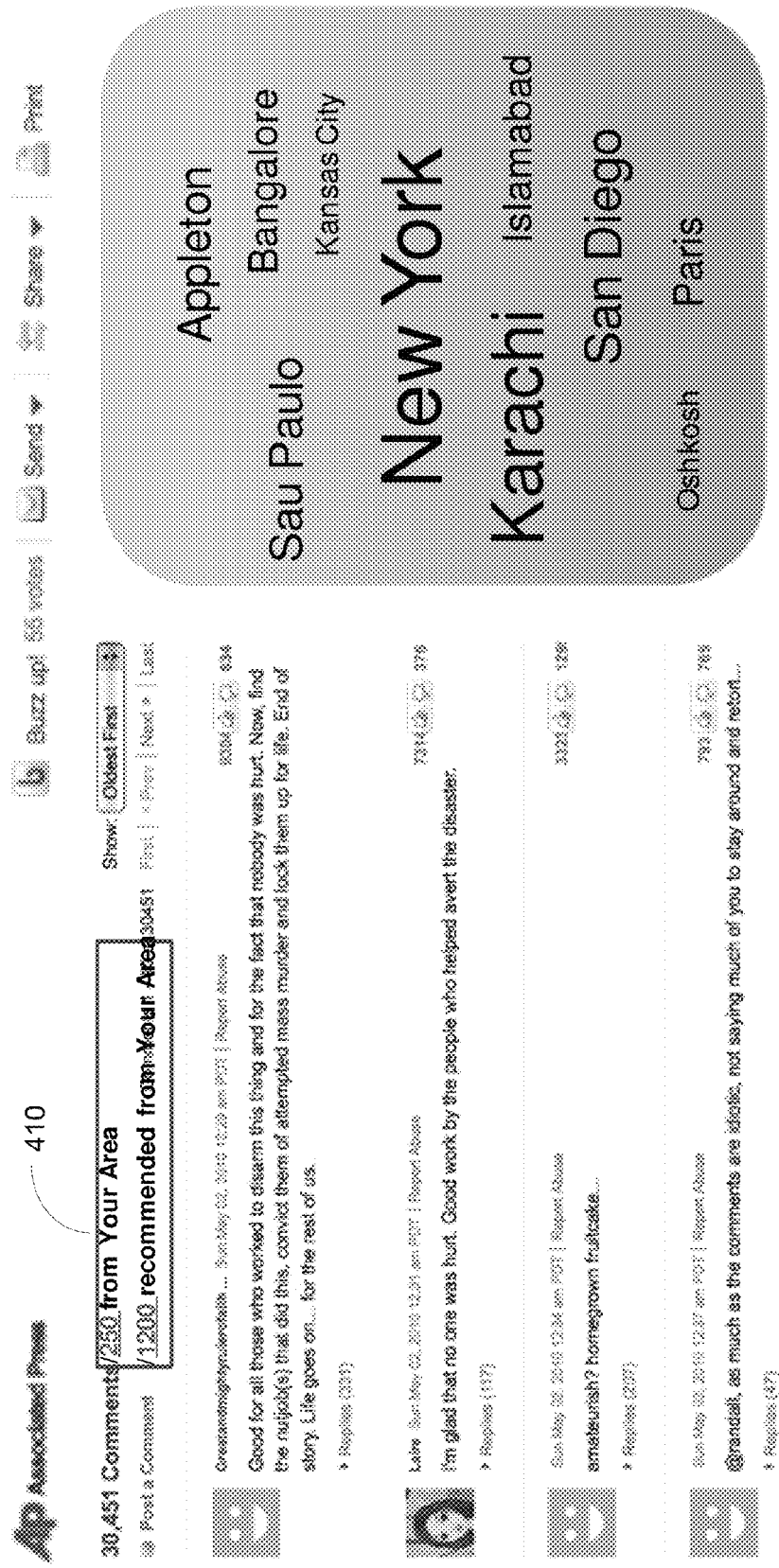
FIG. 5 illustrates a sample webpage with responses and an interactive tag cloud for the user, in an alternate embodiment of the invention.

In addition to the number of comments available for the geo location, the summary box 410 may also provide additional information related to the head content from the geo location presented in the webpage. FIG. 5 illustrates the additional information provided in the summary box 410. As illustrated, in addition to the number of comments from the geo location presented in the webpage, which may be the geo location of the user or the geo location that the user last selected, the summary box 410 includes the number of recommendations (i.e. 1200 recommendations) available for the head content at the geo location. The number of comments may be stored in the counter for each geo location and additional information related to the head content, such as number of recommendations, from each user may be stored within the counter separately or may be stored separately but mapped to the geo location so that the additional information can be retrieved for presenting in the summary box 410. The recommendations may include thumbs-up, thumbs-down, like, dislike, ratings, etc. The webpage may also provide other tools and options for the user, such as a filtering tool for ordering the responses, a sharing tool, one or more social network tools, a printing tool, etc.

Figure 6:
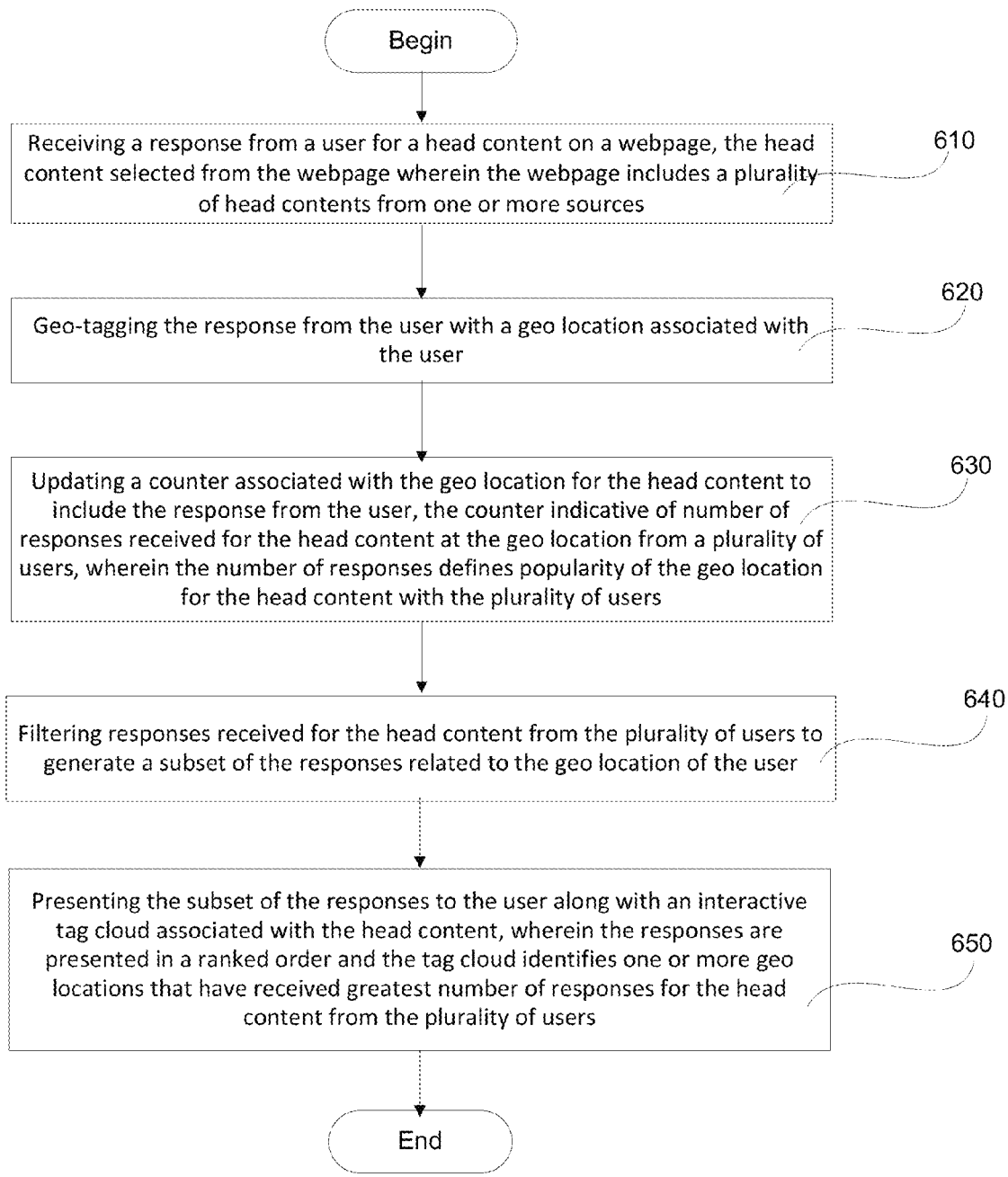
FIG. 6 illustrates a flow chart of process flow operations used by a refresh algorithm for providing social feeds from a plurality of third party sites, in one embodiment of the invention.

With the aforementioned detailed description of the various embodiments, a method for allowing a user to participate in an online conversation will now be described with reference to FIG. 6. FIG. 6 illustrates the various process flow operations of the method. The method begins at operation 610 when a response is received from a user for a head content on a webpage. The head content is selected from the webpage wherein a plurality of head contents from one or more sources are rendered. The head content may be a news article presented on the webpage from a content provider, such as a news website. The user's geo location is identified and the response from the user is geo-tagged with the geo location of the user, as illustrated in operation 620. A counter, such as a response counter, associated with the geo location is incremented to include the response from the user, as illustrated in operation 630. The counter keeps track of the number of responses received from a plurality of users at the particular geo location, for the head content. The value of the counter defines the popularity of the geo location for the head content amongst the plurality of users. A plurality of responses provided by a plurality of users for the head content from various geo locations is filtered to identify a subset of responses that belong to the geo location of the user, as illustrated in operation 640. The method concludes with the presentation of the subset of the responses to the user along with an interactive tag cloud associated with the head content in response to the selection of the head content and receiving a comment/response from the user for the selected head content, as illustrated in operation 650. The responses are presented in a ranked order. In one embodiment, the responses are ranked based on the option selected using a filtering tool available at the webpage. In another embodiment, the responses are ranked based on a decreasing order of popularity. The responses may be ranked in any order so long as the responses for the geo location are all presented to the user for the head content.

Figure 7:
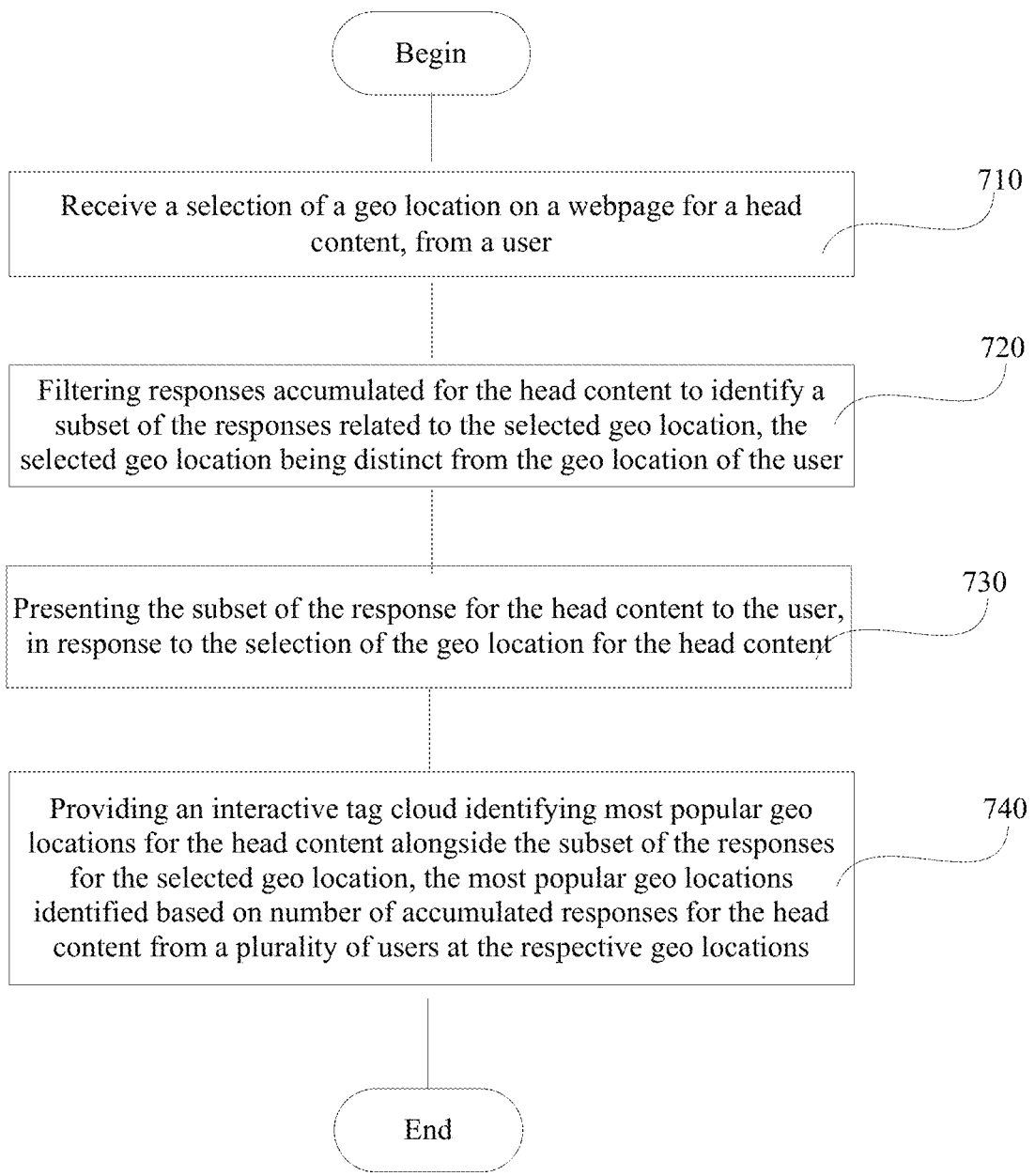
FIG. 7 illustrates a flow chart of various process flow operations used by a refresh algorithm for providing social feeds from a plurality of third party sites, in an alternate embodiment of the invention.

FIG. 7 illustrates an alternate embodiment of a method for allowing a user to participate in an online conversation. The method begins at operation 710 when a user selects a geo location on a webpage for a head content, such as a news article from a news website. The user's attributes are analyzed to identify at least a user identifier and a geo location associated with the user. Responses accumulated for the head content from a plurality of users from various geo locations are filtered to identify a subset of the responses that relate to the geo location selected by the user, as illustrated in operation 720. The selected geo location is different from the geo location of the user. The user may select a different geo location using a location change widget provided on the webpage. The subset of the responses for the head content is presented to the user, in response to the selection of a different geo location, as illustrated in operation 730. An interactive tag cloud is also provided alongside the subset of responses for the head content, as illustrated in operation 740. The interactive tag cloud identifies a subset of geo locations that have accumulated most number of responses from a plurality of users. The subset of geo locations are presented as links so that a user can select a particular geo location available in the tag cloud and responses from the particular geo location will be presented to the user.

The algorithm thus provides an efficient tool to present the most relevant comments for a user to consume, increasing the chances of user interaction at the relevant head content thereby enhancing user's engagement. The algorithm provides the user with the ability to change the geo location and the algorithm identifies and presents responses for the head content from a new geo location selected by the user. An interactive tag cloud provided alongside the responses also provides the user with the ability to view responses from different geo locations without having to change his/her own geo location. In other words, the algorithm provides the ability to change the geo location of the user to a new geo location so that subsequent responses from the user are accounted under the new geo location and the responses for the new geo location are filtered and rendered along with a tag cloud for the head content. The user also has the ability to select a different geo location from within the tag cloud to view the responses for that geo location without having to change the geo location of the user.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for allowing a user to participate in an online conversation for a head content, comprising:
   receiving a response from a user for the head content on a webpage, the head content selected from the webpage wherein the webpage includes a plurality of head contents from one or more sources, the response is provided as any one of rating, recommendation or comment;
   geo-tagging the response with a geo location associated with the user;
   updating a counter associated with the geo location to include the response from the user, the counter tracking number of responses received from a plurality of users at the geo location for the head content, wherein the counter is indicative of popularity of the respective geo locations with the plurality of users, for the head content;
   filtering responses received from the plurality of users for the head content to generate a subset of the responses related to the geo location of the user; and
   transmitting the subset of responses to the user along with an interactive tag cloud associated with the head content for rendering at a client device, wherein the responses within the subset are presented in a ranked order and the tag cloud identifies one or more geo locations that have received greatest number of responses for the head content from the plurality of users.

2. The method of claim 1, wherein receiving a response further includes,
   providing a widget for selecting a new geo location associated with the user prior to receiving a response from the user; and
   associating the response received from the user to the new geo location.

3. The method of claim 1, wherein presenting the interactive tag cloud further includes,
   adjusting text sizes of the geo locations presented in the tag cloud based on the respective counters, the tag cloud providing a visual representation of the popularity of the geo locations with the plurality of users by presenting text of varying sizes for the different geo locations corresponding to the value in the respective counter.

4. The method of claim 1, further includes,
   receiving a selection of a geo location presented in the tag cloud, from the user, wherein the selected geo location is different from the geo location of the user;
   accumulating responses from a plurality of users for the selected geo location; and
   presenting the accumulated responses for the selected geo location for the head content to the user in response to the selection of the geo location, the accumulated responses are presented in a ranked order based on popularity.

5. The method of claim 1, further includes,
   continuing to receive responses from a plurality of users for the head content;
   incrementing the counter for each of the respective geo locations for which responses have been received; and
   updating the tag cloud to reflect the top geo locations that are most popular with the plurality of users based on the value in the counter of the corresponding geo locations, wherein the receiving, incrementing and updating are performed in substantial real-time.

6. A method for allowing a user to participate in an online conversation for a head content, comprising:
  receiving a selection of a geo location on a webpage, from a user, the webpage having rendered responses received for the head content from a geo location of the user, the selected geo location being different from the geo location of the user;
  filtering responses from a plurality of geo locations accumulated for the head content to generate a subset of the responses related to the geo location selected by the user;
  presenting the subset of the responses for the head content to the user, in response to the selection of the geo location; and
  providing an interactive tag cloud alongside the subset of the responses, the interactive tag cloud identifying most popular geo locations for the head content based on number of accumulated responses for the head content from a plurality of users at the respective geo locations.

7. The method of claim 6, wherein the geo location is selected using a location change widget provided on the webpage.

8. The method of claim 6, wherein the geo location is selected from a tag cloud rendered alongside the responses on the webpage.

9. The method of claim 6, further including,
  receiving the responses from a plurality of users from a plurality of geo locations for the head content continually; and
  updating a counter for each geo location in substantial real time based on the responses received from the plurality of users associated with the respective geo locations, the updating resulting in refining the most popular geo locations in the interactive tag cloud in substantial real time based on the number of responses for the head content at the corresponding geo locations.

10. The method of claim 9, wherein presenting the interactive tag cloud further includes,
  adjusting text sizes of the geo locations presented in the tag cloud based on the respective counters, the tag cloud providing a visual representation of the popularity of the geo locations with the plurality of users by presenting text of varying sizes for the different geo locations corresponding to the value in the respective counter.

11. The method of claim 6, further includes,
  receiving a response from the user, the response tagged with a current geo location selected by the user; and
  updating the counter associated with the selected geo location to include the response received from the user.

12. A non-transitory computer program product comprising program instructions embodied on a computer readable medium for allowing a user to participate in an online conversation for a head content, the program instructions comprising:
  program instructions for receiving a response from a user for the head content, wherein the response is provided as any one of rating, recommendation or comment;
  program instructions for geo-tagging the response with a geo location associated with the user;
  program instructions for updating a counter associated with the geo location to include the response from the user, the counter tracking number of responses received from a plurality of users at the geo location for the head content, wherein the counter is indicative of popularity of the respective geo locations with the plurality of users, for the head content;
  program instructions for filtering responses received from the plurality of users for the head content to generate a subset of the responses related to the geo location of the user; and
  program instructions for presenting the subset of responses to the user along with an interactive tag cloud associated with the head content, wherein the responses within the subset are presented in a ranked order and the tag cloud identifies one or more geo locations that have received greatest number of responses for the head content from the plurality of users.

* * * * *